United States Patent [19]

Goorsenberg

[11] Patent Number: 5,704,743
[45] Date of Patent: Jan. 6, 1998

[54] DEBURRING TOOL

[75] Inventor: Hendrikus Wilhelmus Johannes Goorsenberg, Weurt, Netherlands

[73] Assignee: Goorsenberg Beheer B.V., Nijmegen, Netherlands

[21] Appl. No.: 530,265

[22] PCT Filed: Feb. 21, 1994

[86] PCT No.: PCT/NL94/00042

§ 371 Date: Oct. 13, 1995

§ 102(e) Date: Oct. 13, 1995

[87] PCT Pub. No.: WO94/20249

PCT Pub. Date: Sep. 15, 1994

[30] Foreign Application Priority Data

Mar. 1, 1993 [NL] Netherlands ............... 9300375

[51] Int. Cl.[6] .................................................. B23B 51/00
[52] U.S. Cl. .................................... 408/159; 408/180
[58] Field of Search ............................... 408/80, 81, 93, 408/153, 158, 159, 180, 157, 182, 181, 183

[56] References Cited

U.S. PATENT DOCUMENTS

| 2,404,027 | 7/1946 | Belanger. | |
|---|---|---|---|
| 2,438,558 | 3/1948 | Hollander. | |
| 2,959,109 | 11/1960 | Buchan | 408/159 |
| 3,017,791 | 1/1962 | Fried | 408/180 |
| 3,019,712 | 2/1962 | Winberry, Jr. | 408/180 |
| 3,318,175 | 5/1967 | Cogsdill | 408/159 |
| 3,540,325 | 11/1970 | Artaud. | |
| 3,827,821 | 8/1974 | Swenson | 408/180 |
| 4,475,852 | 10/1984 | Koppelmann | 408/159 |

FOREIGN PATENT DOCUMENTS

| 67 387 | 8/1892 | Germany. |
|---|---|---|
| 34 32 035 | 5/1985 | Germany. |

*Primary Examiner*—Daniel W. Howell
*Attorney, Agent, or Firm*—Young & Thompson

[57] ABSTRACT

A deburring tool which has a holder from which an elongated sleeve extends. A blade is arranged in the sleeve close to the free end thereof which can be moved inside or outside the sleeve with a movable pin. The blade extends outside the sleeve through a close fitting opening made in the wall of the sleeve in such a way that its cutting side abuts a limiting edge of the opening in the sleeve thereby closing the opening.

12 Claims, 3 Drawing Sheets

DEBURRING TOOL

The invention relates to a deburring tool comprising a holder from which an elongated sleeve extends, a machining element which is arranged close to a free end of the sleeve, is movable in the latter and has a machining side, an opening which is made in the wall of the sleeve close to the free end thereof and is delimited by a limiting edge, and having control means which are able to engage on the machining element in the sleeve in such a way that said machining element in a first position is located inside the periphery of the sleeve and in a second position protrudes, with its machining side, via said opening, at least partially outside the sleeve.

A deburring tool of this type is disclosed in U.S. Pat. No. 2,438,558. Burrs which arise on the machining edges during a mechanical machining operation, such as, for example, the drilling of holes, can be removed using a tool of this type.

In order to remove, for example, buns at the edges of drilled holes which terminate in a cavity within a workpiece or product, the elongated sleeve must be inserted so far into the drilled hole that the free end of said sleeve, where the machining element can protrude outwards, extends beyond the drilled hole into the said cavity. The machining element is then moved outside the periphery of the sleeve with the aid of the control means and locked in this position.

By withdrawing the elongated sleeve, the machining element is then made to engage on the edge which is to be deburred and is inside the workpiece. The buns can then be effectively removed by then exerting a pulling and turning movement on the sleeve.

After the buns have been removed, the machining element is released again with the aid of the control means, so that said element can return inside the periphery of the sleeve and the sleeve can be withdrawn from the drilled hole concerned.

The sleeve has a two-fold function, i.e. the introduction and withdrawal of the machining element into and out of a drilled hole without damaging the wall thereof and stable support of said element, so that, for example, in the case of a cylindrical drilled hole and sleeve the edge of the drilled hole to be deburred retains its circular shape.

However, the known deburring tool has the disadvantage that material shaved off during machining can easily penetrate into the sleeve via the opening through which the machining element protrudes outwards and can accumulate in said sleeve. The consequence of this is that the machining element is not able to return completely to its first position in the sleeve and/or can do so only with difficulty, with the risk of undesired damage to the wall of the drilled hole during removal of the tool.

Other known embodiments of deburring tools, such as, for example, are disclosed in German Patent 67,387, U.S. Pat. Nos. 2,404,027 and 3,540,325 and German Patent Application 3,432,035, all likewise have the risk of obstruction of the maching element by machined material accumulating in the sleeve around the machining element during use.

The fact that these tools are nowadays not used or hardly used in practice and that such burrs are usually removed using a file or steel scraper is probably a consequence of this disadvantage. The use of a file involves the risk that, for example, the wall of a drilled hole or other pans of a workpiece can be damaged, whereas working with a steel scraper can be a very time-consuming task, especially when deburring the intersection of two drilled holes in a workpiece or product. Moreover, a file can not be used, for example, for deburring drilled holes which open centrally inside an elongated tube or pipe.

The object on which the invention is based is to provide an improved deburring tool with which it is possible efficiently to remove burrs formed during machining operations, in particular at the edges of drilled holes terminating in a cavity inside a workpiece, without damaging the wall of the drilled hole and irrespective of the dimensions or shape of the product.

The deburring tool according to the invention is characterised in that the dimensions of the opening in the sleeve and the machining element being designed for a close fit and in that, in the second position of the machining element, the machining side of said element abuts the opposing limiting edge of the opening, closing it off, wherein the knife-shaped element is trapezium-shaped having two parallel sides and at least one oblique side and fixed in the sleeve in a hinged manner.

The construction according to the invention is based on the insight that undesired obstruction of the machining element can be effectively prevented precisely where machined material is produced, that is to say at the machining side of the machining element, by means of suitable measures against the penetration of machines material into the sleeve. According to the invention this is achieved by the machining side of the machining element abutting the limiting edge of the opening in the sleeve during machining, closing it off, in combination with a close fit between the machining element and the opening concerned.

It will be clear that there is a relationship between the dimensions of the machining element and the diameter of a drilled hole which is, for example, to be deburred. The smaller the cross-section of the drilled hole, the finer the machining element has to be. Machining elements suitable for the purpose of the invention can, for example, be in the form of a chisel, milling cutter of grinding stone.

A slit-shaped opening and knife-shaped machining element of this type can be constructed to fit closely in such a way that penetration and accumulation of machined material in the sleeve can be restricted to an insignificant amount, without the risk of obstruction of the knife when said knife returns to the first position in the sleeve. In addition to its closing action, the slit-shaped opening also provides adequate support for the (thin) knife-shaped element during deburring.

In a further embodiment of the invention, wherein the control means comprise an element which is movable in the longitudinal direction of the sleeve and can engage on the knife-shaped element in order to tilt said element about the hinge point in such a way that the cutting edge at least partially protrudes outside the sleeve, the knife-shaped, element is hinged in the vicinity of the oblique side of said element, and in that the element engages on said oblique side of the knife-shaped element for tilting it towards and against the opposing limiting edge.

The knife-shaped element constructed in this way can be tilted to the outside via the slit-shaped opening in the sleeve by moving the control element in the direction of the free end of the sleeve and can return into the sleeve again under the effect of its own weight.

Preferably, the knife-shaped element has the shape of a rectangular trapezium, with a long base side desired as the cutting edge and an opposing short base side, the movable control element being an elongated pin fitted so that it can slide in the sleeve in the longitudinal direction thereof, one end of said pin engaging, in the first position of the knife-shaped element, on the oblique upright side thereof in the vicinity of the short base side and the oblique upright side resting on the elongated pin in the second position of the knife-shaped element.

This embodiment has the advantage that the moment of force exerted during use of the knife-shaped element is transmitted to the pin over the entire supporting length. As a result, the deburring tool according to this embodiment can also be used for extreme applications, such as, for example, the machining of very hard material.

In yet a further embodiment of the invention the upright side of the knife-shaped element located opposite the oblique upright side is also designed as a cutting edge, in particular for deburring drilled holes which open into one another inside a workpiece.

Using a knife-shaped element constructed in this way it is possible, by inserting the free end of the sleeve into a further drilled hole, opposite the drilled hole into which the sleeve has been inserted, by the action of a pressing and turning force on the tool, to cut away a burr formed at the edge of said further drilled hole. An intersecting through drilled hole and blind drilled hole can be considered, for example, in this context. Although the sleeve is supported by the drilled hole into which it has been inserted, a supplementary supporting effect can be achieved, especially in drilled holes in relatively thin walls, by arranging the knife-shaped element in the sleeve some distance away from the free end thereof. Of course, there is also an excellent possibility for deburring machining edges on the outside of a workpiece using this embodiment of the invention.

Although the emphasis in the above has been placed on the removal of burrs, the tool according to the invention can also suitably be used for, for example, countersinking the edges of drilled holes, for example for fitting screws or bolts having a countersunk head in said holes. In the case of a drilled hole through the wall of a tube, pipe or the like, it is also possible, using the tool according to the invention, to countersink that edge of the drilled hole which ends in the tube or pipe. This can be done only inadequately or not at all using the means known in practice, such as a steel scraper, and is a very time-consuming task. Damage to the walls of a drilled hole is virtually excluded with the deburring tool according to the invention, provided said tool is used correctly.

In particular for applications where a relatively large amount of material is cut away, such as when countersinking the edges of holes, in yet a further embodiment of the invention the outer wall of the sleeve is provided, over a section adjoining the opening, with a recess for collecting material cut away during use.

In a technically relatively simple, but robust embodiment of the invention, the other end of the elongated pin engages on a sliding bush fixed to the holder, in order to move the pin in the longitudinal direction of the sleeve, for example manually.

In the preferred embodiment of the deburring tool according to the invention, the sleeve, with the at least one machining element fitted therein, is detachably fixed to the holder. By matching the external diameter of the sleeve closely to the diameter of, for example, a drilled hole, a desired stable support of the deburring tool can always be achieved, in order to prevent deviations in the circular shape of the edges of the hole concerned as a consequence of deburring.

In the simplest embodiment, the sleeve can be detachably fixed to the holder by means of a set screw. Rapid interchangeability can be achieved by means of an embodiment of the invention wherein the sleeve is provided with a drilled hole in which a movable locking element is incorporated and wherein the holder has a locking recess such that, when the sleeve is fitted on the holder, the locking element engages in said locking recess under the influence of the sliding bush and locks the sleeve firmly to the holder, and wherein, by suitably sliding the sliding bush, the locking element can be made to disengage from the locking recess to unlock the sleeve from the holder, a releasable lock enabling the sliding bush to be slid into the unlocked position being fitted in the holder.

Sleeves can be changed rapidly in the embodiment concerned without the use of supplementary tools, such as a screwdriver. By also making the knife-shaped element easily interchangeable, in accordance with an embodiment of the invention wherein the knife-shaped element is provided with a slit-shaped opening terminating in the said oblique upright side and wherein the hinge point is formed by a shaft fitted in the sleeve, over which shaft the knife-shaped element can be exchangeably fitted via its slot-shaped opening, a universal deburring tool which is easy to use is provided. The holder can be equipped with a grip either for holding the tool by hand or for fitting it in a machine, for example the chuck of a drill.

The tool according to the invention can be used for machining products made of metal, wood, plastic and the like. Furthermore, the sleeve, the knife-shaped element and the holder can be manufactured as separate components.

The invention is illustrated in more detail below with reference to drawings of two embodiments.

Figure 1:
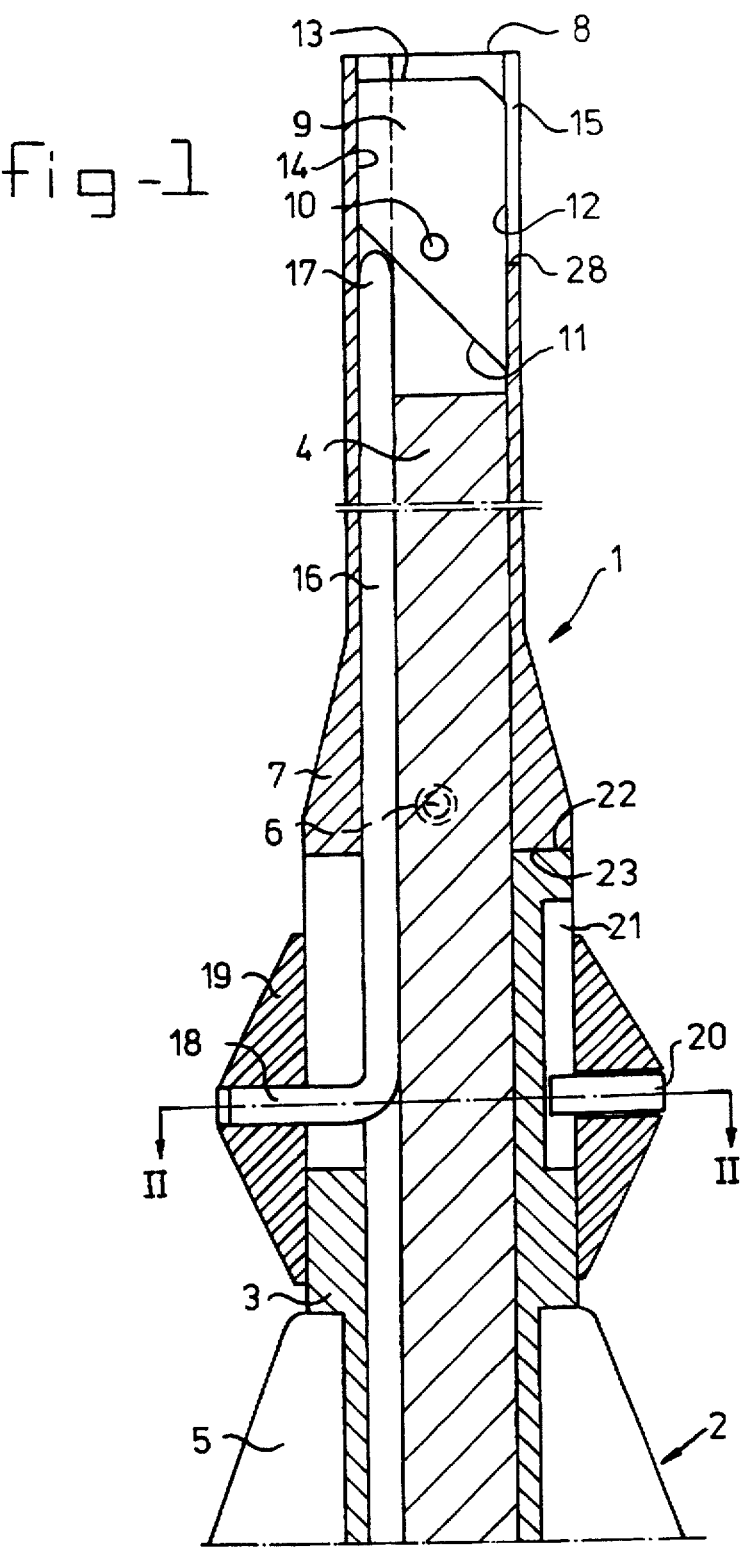
FIG. 1 shows, diagrammatically, a partial longitudinal section of the deburring tool according to a first embodiment of the invention.

In FIG. 1 the deburring tool according to a first embodiment of the invention is indicated in its entirety by reference number 1. The tool is constructed around a holder 2 in the form of a bush 3, in which an elongated rod 4 made of, for example, plastic or metal, extends. A grip 5, which is still partially visible in the figure, for holding the deburring tool 1 by hand is fitted at one end of the rod 4. An elongated cylindrical sleeve 7, which is open at both ends is interchangeably connected to the holder 2 at the other end of the rod 4 with the aid of a set screw 6.

In the sleeve 7, only part of which is shown in the figure, a knife-shaped element 9 in the shape of a rectangular trapezium is arranged close to the free end 8 of said sleeve. Close to its oblique side 11, the knife-shaped element 9 is fixed in the sleeve 7 so that it is hingable about a shaft 10. A close-fining slit-shaped opening 15 is located in the wall of the sleeve 7 facing the long base side 12 of the knife-shaped element 9. In the embodiment shown both the long base side 12 and the straight upright side 13 of the knife-shaped element 9 are constructed as cutting edges.

Figure 2:
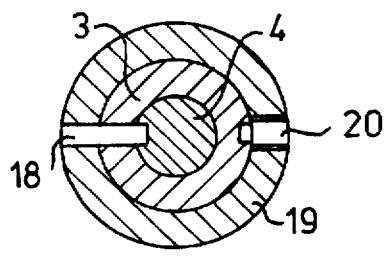
FIG. 2 shows, diagrammatically, the cross-section along the line II—II in FIG. 1.

From the holder 2, an elongated pin 16 also extends into the sleeve 7, one end 17 of said pin being able to engage on the oblique side 11 of the knife-shaped element 9 in the vicinity of the short base side 14 thereof. The pin 16 can be slid in the sleeve 7 in the longitudinal direction thereof, with the aid of a sliding bush 19, which is connected to the other end 18 of the elongated pin 16, which end 18 is bent at right angles. In the embodiment shown, the sliding bush 19 has a triangular cross-section for, for example, moving the sliding bush with the thumb in the longitudinal direction of the holder 2. The sliding bush 19 is preferably made of plastic and provided with a non-slip, ribbed surface. To delimit the movement of the sliding bush 19, a limiter bolt 20 is screwed into said bush, which bolt interacts with a groove 21 formed at the circumference in the holder 2. See also FIG. 2.

Figure 3:
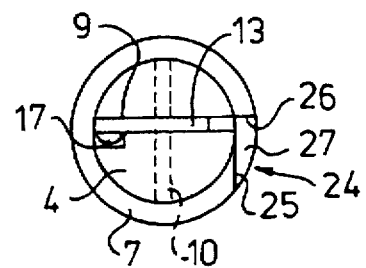
FIG. 3 shows, diagrammatically the view towards the free end of the deburring tool according to FIG. 1.

In the view shown in FIG. 3 towards the free end 8 of the sleeve 7 it can be seen that, in a section of the outer wall of the sleeve 7 which adjoins the slit 15, a recess 24 has been formed by removing a section of the wall of the sleeve 7 extending from the end 8 to beyond the knife-shaped element 9. This recess 24 is delimited by side walls 25, 26 and 27 and serves to collect material cut away when the deburring tool is in use.

Figure 4:
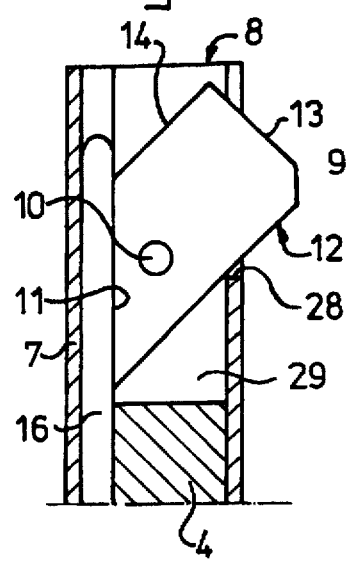
FIG. 4 shows, diagrammatically, in longitudinal section, a detail of the deburring tool according to FIG. 1, with the knife-shaped element protruding outwards.

FIG. 1 shows the knife-shaped element 9 in its first position located inside the periphery of the sleeve 7. By sliding the pin 16 in the direction of the free end 8 using the sliding bush 19, the knife-shaped element 9 will tilt about the shaft 10 in such a way that the long base side 12 and the straight upright side 13 thereof partially protrude via the slit 15 at acute angles with the longitudinal centre line of the sleeve 7, outside the periphery thereof, as shown in FIG. 4. Because the oblique side 11 of the knife-shaped element 9 engages on the pin 16, as shown, the knife-shaped element is, in this second position, effectively blocked against tilting back and the moment of force exerted on the knife-shaped element 9 is transmitted to the pin 16 over the entire supporting length. When the pin 16 is pushed back in the sleeve 7, the knife-shaped element 9 can, as a result of its trapezium shape, tilt back again into its first position inside the periphery of the sleeve 7 under the influence of its own weight.

The deburring tool 1 according to the invention can be used to remove burrs at edges of arbitrarily shaped drilled holes or other edges formed by mechanical machining. Preferably, the tool is used for deburring circular edges.

For machining machined edges which terminate in a cavity in a workpiece, such as an edge of a drilled hole, the sleeve 7 is inserted so far into the drilled hole that the free end 8, including the knife-shaped element 9, extends beyond the edge of the drilled hole into the said cavity in the workpiece. By now moving the sliding bush 19 in the direction of the free end 8 of the sleeve 7, the knife-shaped element tilts out of its first position inside the periphery of the sleeve 7 into its second position protruding to the outside, in the position shown in FIG. 4. By then drawing the entire tool 1 backwards, in such a way that the cutting edge or long base side 12 of the knife-shaped element 9 is pulled against the edge of the drilled hole concerned into the burr, the latter can be cut away by means of a turning movement under the influence of tensile force. During this operation, the sleeve 7 provides a stability such that the circular shape of the drilled hole edge concerned is not impaired, for example does not become oval. This risk exists especially when machining relatively soft material.

After completing deburring, the pin 16 is pulled backwards into the sleeve by means of the sliding bush 19, as a result of which the knife-shaped element 9 tilts back into the sleeve 7 again and the tool 1 can be removed from the drilled hole concerned, without damaging the wall thereof.

To deburr edges of blind drilled holes in a workpiece or machined edges on the outside of a product, the free end 8 of the sleeve 7 can be introduced into the drilled hole concerned, obviously after the knife-shaped element 9 has first been brought outside the sleeve 7. The edge concerned is now deburred using the tool 1, by means of the cutting edge or straight upright edge 13, under the influence of a compressive force and by turning. Edges of drilled holes which run into or intersect one another inside a workpiece can also be easily and effectively deburred in this way.

As is clearly illustrated in FIG. 4, in the second position the long base side 12 of the knife-shaped element 9, which base side is constructed as a cutting edge, abuts the narrow delimiting edge 28 of the slit 15, closing it off. As a result of the close fit of the opening of the slit 15 and the knife-shaped element 9, the penetration and accumulation of cut-away material inside the sleeve 7 in the cavity 29 around the knife-shaped element 9 is effectively prevented or reduced to such an extent that the knife-shaped element 9, after withdrawing the pin 16, can tilt back inside the periphery of the sleeve 7 again. Any cut-away material which has penetrated inside the sleeve 7 from the free end 8 thereof does not cause any obstruction for the knife-shaped element 9 tilting back into the first position because, as a result of withdrawal of the pin 16, sufficient space becomes available in the sleeve 7 for distribution of said material, which, incidentally, can be only an insignificant amount because the bulk of the material is freed at the long base side or cutting edge 12 where, however, an adequate closure against the penetration of cut-away material is provided.

A close fit of the sleeve 7 is required in order as far as possible to prevent deformation of the edges of circular drilled holes. In a practical embodiment of the deburring tool, sleeves 7 are provided with external diameters matched to the drilled holes to be machined. For sleeves which have diameters in the ranges 2.5–3.5; 3.5–4.5; 4.5–6; 6–8; 8–10; 10–12 and 12–15 mm, holders 2 are provided with rods 4 of suitable dimensions. The knives used in these cases vary in thickness from 0.2 to 3 min. Of course, other dimensions are also possible. The sleeves, including the knife-shaped element fitted therein, can be interchangeably connected to the relevant holder 2 by means of the set screw 6, to which ends a respective sleeve 7 is provided with a stop 22 and the holder is provided with a stop 23, which stops engage on one another when the sleeve is in the fitted position.

The sleeve 7 can be made of plastic or metal. The knife-shaped element 9 is made of metal, for example HSS or PM material, which material allows small thickness, which is necessary for deburring the edges of drilled holes of relatively small diameter.

Figure 5:
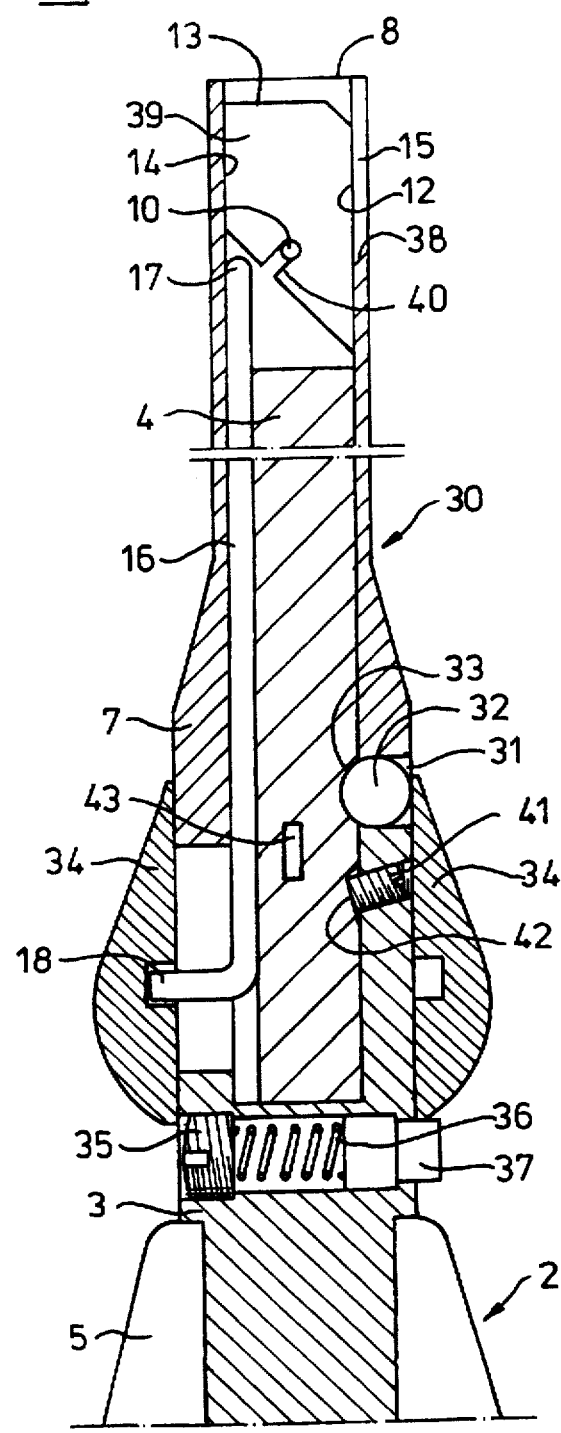
FIG. 5 shows, diagrammatically, a partial longitudinal section of the deburring tool according to the preferred embodiment of the invention.

FIG. 5 shows a preferred embodiment of the deburring tool according to the invention, which is indicated in its entirety by the reference numeral 30. Components which in terms of design or function correspond to those in the deburring tool 1 illustrated in FIG. 1 are indicated by the same reference numerals.

A so-called quick-release coupling is provided for rapid changing of the sleeve 7, which coupling comprises a through hole 31, made in the sleeve 7 close to the end to be connected to the holder 2, in which hole a spherical locking element 32 is able to move. The diameter of the ball 32 is greater than the wall thickness of the sleeve 7 at the location of the hole 31. A locking recess 33 matched to the spherical shape of the locking body 32 is made, at the height where the locking body 32 engages, in the rod 4 firmly connected to the holder 2.

When the holder 2 and the sleeve 7 are assembled, as shown in FIG. 5, the locking body 32 engages under the influence of the sliding bush 34 in the locking recess 33, as a result of which the sleeve 7 is held firmly on the holder 2.

By sliding the sliding bush 34 away from the locking body 32, the locking body 32 can be made to disengage from the locking recess for disconnecting the sleeve 7 from the holder 2. To prevent undesired sliding of the sliding bush 34, a releasable lock is provided in the form of a nipple 37 fitted in the holder 2 behind the sliding bush 34, seen in the direction of the grip 5, which nipple 37 can be pressed in against the resilience of a compression spring 36 located in a spring seat 35. By manually pressing in the nipple 37, the sliding bush 34 can be slid away from the locking element 32. On sliding the sliding bush 34 into the locked position, as shown, the nipple 37 automatically springs back to lock the sliding bush 34 again. The rod 4 is firmly, but detachably, attached to the holder 2 by means of a screw 41 which engages in a recess 42 in said rod. In order to prevent twisting of the rod 4, a locking pin 43 is also provided, as shown in FIG. 5.

To enable the machining element to be replaced easily, for example when this has become blunt, a knife-shaped element 39 is provided with a slit-shaped opening 40 which fits over the shaft 10 in the sleeve 7. By uncoupling the sleeve 7 in the manner described above, the knife-shaped element 39 can be removed via the opening or slit 15 and a new knife can be inserted. It can also be necessary to replace the knife-shaped element for machining holes of different diameters, in order to ensure a suitable clearance angle between the knife and the workpiece.

In order to provide an optimal closure against penetration of cut-away material into the sleeve 7 around the knife-shaped element 39, the narrow limiting edge 38 of the opening 15, against which the long base side or cutting edge 12 of the knife-shaped element 39 lies in its second position to form a closure, is shaped to taper towards the outside, as shown in FIG. 5.

It will be clear that the deburring tool according to the invention is a fine mechanical instrument with extensive application possibilities, not only for deburring drilled hole edges but also for countersinking said edges. For this purpose, the acute angles which the cutting edges of the knife-shaped element 9, 39 make with the longitudinal centre line of the sleeve 7 can, if desired, deviate from the preferred magnitude of 45 degrees. This can be achieved, on the one hand, by, for example, a suitable choice of the angle of slope of the oblique side 11 of the knife-shaped element 9, 39 and/or by selecting a suitable shape for the knife. For both forwards and backwards countersinking of drilled hole edges, the tool is used in the same way as for deburring.

It will be clear to a person skilled in the art that the preferred embodiment shown can be modified in many ways, but without deviating from the inventive concept. In this context consideration can be given, for example, to arranging several machining elements, which if desired can differ from one another, in the sleeve, for example positioned opposite one another; control means which make a rotary movement instead of a sliding movement, for moving the knives outside the sleeve; supplementary spring means, such that the knife-shaped element is held in the sleeve under spring pressure. The grip 5 can, for example, also be constructed as a pin for clamping it in the chuck of a drill, so that the tool can be fitted, for example, in a machine for deburring or countersinking operations.

I claim:

1. A deburring tool comprising a holder (2) from which an elongated sleeve (7) extends, a machining element (9; 39) which is hinged close to a free end (8) of the sleeve (7), is movable in the sleeve and has a machining side (12), an opening (15) which is made in the wall of the sleeve (7) close to the free end (8) thereof and is delimited by a limiting edge, and having control means (16) which are able to engage the machining element (9; 39) in the sleeve (7) in such a way that said machining element in a first position is located inside the periphery of the sleeve (7) and in a second position protrudes, with its machining side (12), via said opening (15), at least partially outside the sleeve (7), wherein the dimensions of said opening (15) in the sleeve (7) and the machining element (9; 39) are designed for a close fit, and wherein when the machining element (9; 39) is in the second position, the machining side (12) of the said element abuts the limiting edge (28; 38) of the opening (15), closing it off.

2. The deburring tool according to claim 1, wherein the machining element is knife-shaped having two parallel sides and at least one oblique side, and the control means comprise a movable member (16) which is movable in the longitudinal direction of the sleeve and adapted to engage the knife-shaped element (9; 39) in order to tilt said knife-shaped element about a hinge point (10) in such a way that the machining side (12) at least partially protrudes outside the sleeve (7), and wherein the knife-shaped element (9; 39) is hinged in the vicinity of the oblique side (11), and in that the movable member (16) engages said oblique side (11) for tilting it towards and against the limiting edge (28; 38).

3. The deburring tool according to claim 2, wherein the knife-shaped element (9; 39) has the shape of a rectangular trapezium, with a long base side (12) designed as a cutting edge and an opposite short base side (14), the movable member being an elongated pin (16) fitted so that it can slide in the sleeve (7) in the longitudinal direction thereof, one end (17) of said pin (16) engaging, in the first position of the knife-shaped element (9; 39), on the oblique upright side (11) thereof in the vicinity of the short base side (14) and the oblique upright side (11) resting on the elongated pin (16) in the second position of the knife-shaped element (9; 39).

4. The deburring tool according to claim 3, wherein an upright side (13), located opposite the oblique upright side (11), of the knife-shaped element (9; 39) is also constructed as a cutting edge.

5. The deburring tool according to claim 1, wherein the outer wall of the sleeve (7) is provided, over a section adjoining the opening (15), with a recess (24) for collecting material cut away during use.

6. The deburring tool according to claim 3, wherein the other end (18) of the elongated pin (16) engages on a sliding bush (19; 34) fixed to the holder (2), for moving the pin (16) in the longitudinal direction of the sleeve (7).

7. The deburring tool according to claim 1, wherein the sleeve (7), together with the at least one machining element (9; 39) fitted therein, is interchangeably fixed to the holder (2).

8. The deburring tool according to claim 7, wherein the sleeve (7) is provided with a drilled hole (31) in which a movable locking element (32) is incorporated and wherein the holder (2) has a locking recess (33) such that, when the sleeve (7) is fitted on the holder (2), the locking element (32) engages in said locking recess (33) under the influence of the sliding bush (34) and locks the sleeve (7) firmly to the holder (2), and wherein, by suitably sliding the sliding bush (34), the locking element (32) can be made to disengage from the locking recess (33) to unlock the sleeve (7) from the holder (2), a releasable lock (37) enabling the sliding bush (34) to be slid into the unlocked position being fitted in the holder (2).

9. The deburring tool according to claim 3, wherein the knife-shaped element (39) is provided with a slit-shaped opening (40) terminating in the said oblique upright side (11) and wherein the hinge point is formed by a shaft (10) fitted in the sleeve (7), it being possible for the knife-shaped element (39) to be fitted interchangeably via its slit-shaped opening (40) over the shaft (10).

10. A deburring tool, comprising a sleeve with an opening (15) made in the wall of the sleeve (7) close to the free end (8) thereof and delimited by a delimiting edge, via which opening (15) a machining element (9; 39) incorporated in the sleeve (7) close to the free end can protrude with its machining side (12) at least partially outside the sleeve (7), the dimensions of the opening (15) and the machining element (9; 39) being designed for a close fit and the machining element (9; 39), in the position protruding outwards, lying with its machining side (12) abutting the opposing or limiting edge (28; 38) of the opening (15), closing it off.

11. The deburring tool according to claim 10, further comprising an elongated pin (16) which is fitted so that it is slidable in the longitudinal direction and has an end (17) for engaging on the machining element (9; 39), and a sliding bush (19; 34), which is fixed to a holder (2) and engages on another end (18) of the pin (16) for moving the latter in the longitudinal direction.

12. The deburring tool according to claim 10, wherein the machining element (39) has the shape of a rectangular trapezium, having a long base side (12) constructed as a cutting edge and having a slit-shaped opening (40), which terminates in an oblique upright side (11), for interchangeable fitting of the machining element (39).

* * * * *